A. A. HERRIMAN.
Turbine Water-Wheels.

No. 142,628. Patented September 9, 1873.

Witnesses:

Inventor:
A. A. Herriman
Per
Attorneys.

UNITED STATES PATENT OFFICE.

ANGUS A. HERRIMAN, OF GREENSBOROUGH, NORTH CAROLINA.

IMPROVEMENT IN TURBINE WATER-WHEELS.

Specification forming part of Letters Patent No. 142,628, dated September 9, 1873; application filed June 14, 1873.

*To all whom it may concern:*

Figure 1:
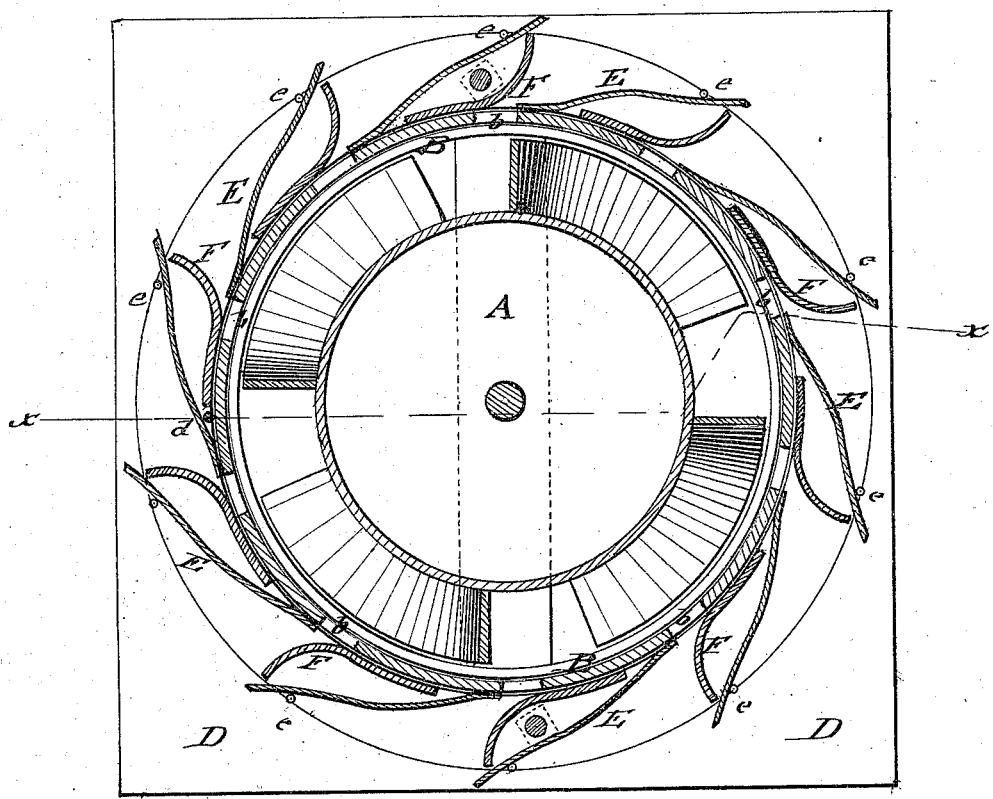
Figure 2:
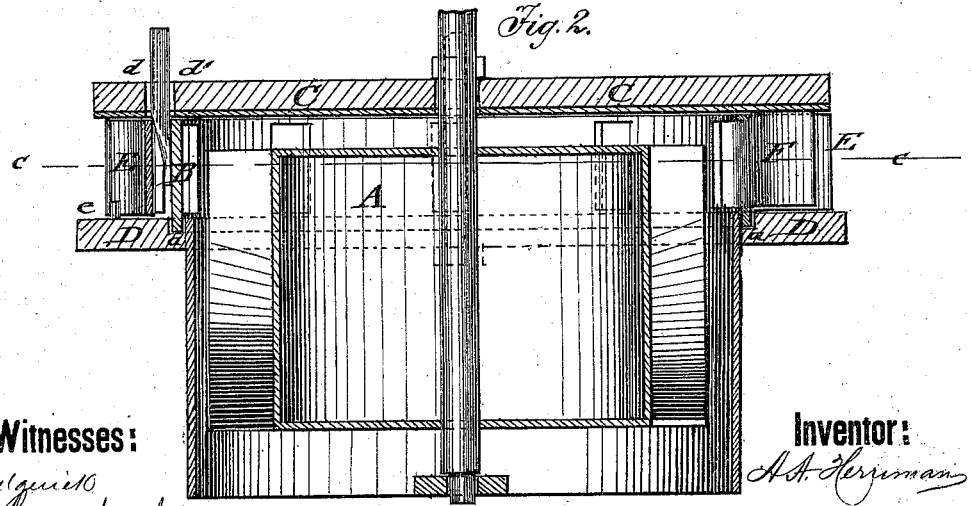

Be it known that I, ANGUS A. HERRIMAN, of Greensborough, in the county of Guilford and State of North Carolina, have invented a new and Improved Water-Wheel, of which the following is a specification:

In the accompanying drawing, Figure 1 represents a horizontal section of my improved water-wheel on the line $c\ c$, Fig. 2, and Fig. 2 a vertical section on the line $x\ x$ of Fig. 1.

Similar letters of reference indicate corresponding parts.

The object of my invention is to so improve the gates and chutes of a water-wheel that an unbroken sheet of water is admitted to strike the wheel without any space for expansion or break of the water, whether the gate be fully or partially open, so that thereby the greatest attainable percentage of power with a partially drawn gate is obtained.

My invention is an improvement in turbines; and consists in the arrangement of flexible wings or guide-plates in connection with the circular sliding gate and the chutes, as hereinafter described.

In the drawing, A represents the water-wheel or turbine; B, the perforated rotating gate, placed closely around wheel A between the top and bottom plates C D, and set into a groove, $a$, of the latter. The gate B is provided with openings $b$, which correspond to the buckets of wheel A. These openings $b$ form the throats for the admission of the water to the buckets. To one side of each opening, $b$, are hinged the adjustable wings E, which guide the water, in connection with the curved chutes F. Chutes F are firmly set between plates C and D, extending in part along the circumference of wheel A, the other part turning outwardly to form the chute. A lever-rod, $d$, is firmly secured to gate B, and passes up through a slot, $d'$, of top C. The gate B is turned on suitable rollers in groove $a$ by means of lever-rod $d$, so as to open or close fully or partially to the wheel.

Any equivalent to rod $d$ may be employed by which the gate may be rotated to regulate the flow of water.

The wings E are guided by pins $e$ of bottom D when the gate B is turned, and thereby the equal flow of water for the different positions of the gate is secured without break or interruption.

Having thus described my invention, I claim as new and desire to secure by Letters Patent—

The rotary gates, chutes F, and hinged wings E combined, to admit of the adjustment described.

ANGUS A. HERRIMAN.

Witnesses:
R. M. SLOAN, Jr.,
GEO. S. SERGEANT.